United States Patent [19]

Cowan et al.

[11] Patent Number: 5,020,598

[45] Date of Patent: Jun. 4, 1991

[54] PROCESS FOR CEMENTING A WELL

[75] Inventors: Kenneth M. Cowan, Sugarland; Arthur H. Hale, Houston, both of Tex.

[73] Assignee: Shell Oil Company, Houston, Tex.

[21] Appl. No.: 363,226

[22] Filed: Jun. 8, 1989

[51] Int. Cl.$^5$ .................... E21B 33/14; C04B 24/02; C04B 26/00

[52] U.S. Cl. .................... 166/293; 106/724; 106/802; 405/266; 405/267

[58] Field of Search ............ 106/90, 724, 802; 166/293, 294; 405/266, 267; 52/744

[56] References Cited

U.S. PATENT DOCUMENTS

| | | | |
|---|---|---|---|
| 3,132,693 | 5/1964 | Weisend | 166/33 |
| 3,409,070 | 11/1968 | Harrison | 106/93 |
| 3,493,529 | 2/1970 | Krohinger et al. | 166/293 |
| 3,711,405 | 1/1973 | Pye et al. | 252/8.55 |
| 3,818,998 | 6/1974 | Hessert | 175/72 |
| 4,258,790 | 3/1981 | Hale | 166/293 |
| 4,433,731 | 2/1984 | Chatterji et al. | 166/293 |
| 4,434,257 | 2/1984 | Narisawa et al. | 106/90 |
| 4,461,856 | 7/1984 | Willis et al. | 523/401 |
| 4,569,395 | 2/1986 | Carpenter | 166/293 |
| 4,687,516 | 8/1987 | Burkhalter et al. | 106/90 |
| 4,742,094 | 5/1988 | Brothers et al. | 523/130 |

*Primary Examiner*—William R. Dixon, Jr.
*Assistant Examiner*—Anthony J. Green

[57] ABSTRACT

Cement-to-casing sealing in a wellbore is improved through addition of a polyalcohol to the cement.

3 Claims, No Drawings

PROCESS FOR CEMENTING A WELL

BACKGROUND OF THE INVENTION

1. Field of the Invention

The present invention pertains to improvements in cementing compositions and processes for cementing wells. The improvements provide better bonding and sealing of cement to adjacent surfaces such as casing and geologic formations. The improved seal provides better containment of fluids produced from or injected into geologic formations. The improved seal is also beneficial in containing fluids produced from or injected into the space between two casings where cement is used as a sealant at some point in the annulus between the casings.

2. Description of Prior Art

Subsequent to drilling a borehole of an oil or gas well, casing is run into the well and a cement slurry is placed in the annulus between the outside of the casing and the borehole wall. Typically, the cement slurry is placed in the annulus using a successive fluid displacement technique. In this technique, the cement is first pumped into the casing. Another fluid, often drilling fluid or water, is pumped behind the cement to displace it out the bottom of the casing and up into the annulus between the casing and borehole wall. The cement slurry is usually raised to a point above the uppermost section of the formations to be isolated and may be raised into the annulus between the casing string being cemented and a previously cemented casing.

Once placed, the purpose of the cement slurry is to harden in the annulus and provide an effective seal between the casing and the borehole. The hardened cement sheath prevents or inhibits communication of fluids between the various formations penetrated by the well. In addition to providing zonal isolation, the cement is in contact with the casing and provides mechanical support and resistance to axial movement through the shear bond developed between the interfaces of cement and pipe and cement and formation.

Bonding of the cement to the casing and borehole surfaces is critical to providing an effective seal in the annulus and for providing support for casings. Under most conditions, the bonding of cement to casing is achieved through contact of the cement particles with the surface of the casing. The resulting region of contact provides a mechanical interface which impedes movement of the casing due to high frictional forces. A fluid seal between cement and casing is effected by close contact of the cement particles at the casing surfaces which results in a region of very low effective permeability that prevents fluid migration along the interface.

Bonding between the cement and borehole wall is also achieved through contact of the cement particles with the formation or drilling fluid filter cake commonly deposited at the borehole wall during the drilling of the borehole. Some chemical combinations may also occur between the cement and formation or filter cake which may further enhance bonding and sealing at this interface. However, for this to occur the filter cake or formation should be water wet.

The present invention provides improved contact of the cement particles in an aqueous slurry at the interfaces of casing and formation or filter cake on the borehole wall. The improved contact is retained after the cement hardens resulting in a better fluid-tight seal at the interfaces of cement and casing and cement and borehole wall. Better mechanical bonding between the cement sheath and casing and cement sheath and borehole wall is also realized.

SUMMARY OF THE INVENTION

Applicant has discovered that the interfacial sealing and bonding between a cement and casing or borehole can be improved by addition of a polyalcohol to the cement slurry. A polyalcohol is defined as an alcohol containing more than one hydroxyl group. The polyalcohols, especially the diols and polyol alcohols, of the invention promote spreading and adhesional contact of the cement particles along the surfaces of the casing and borehole. The result is greater contact area of the cement particle surface with the surfaces of casing and borehole. Greater contact area promotes a fluid-tight seal and better mechanical shear bond between casing, cement and borehole.

Accordingly, the present invention provides a process for cementing a casing in a borehole of a well, comprising injecting an aqueous cement slurry into the well between the casing and the borehole, the slurry containing a sufficient amount of a water soluble polyalcohol having from 2 to 18 carbon atoms and 2 to 13 hydroxyl groups and functional to promote a more fluid-tight seal and better mechanical shear bond between the cement and surfaces contacting the cement.

In yet another embodiment, the present invention provides a cement composition for the preparation of an aqueous slurry useful in cementing a selected part of a well, the cement composition comprising an aqueous cement slurry and a sufficient amount of a water soluble polyalcohol having from 2 to 18 carbon atoms and 2 to 13 hydroxyl groups and functional to improve interfacial sealing and bonding between the cement and surfaces contacting the cement.

The cement of the present invention is injected into a selected "part" of the well. This "part" may be between casings, between a casing and a borehole, between a casing and a filter cake deposited on a borehole, etc. The cementing may be a "primary" cementing application or the repairing of a previous cementing application, e.g., "remedial" or "squeeze" cementing which can be conducted through perforations in the casing and fractures in the old cement, etc.

Other purposes, distinctions over the art, advantages and features of the invention will be apparent to one skilled in the art upon review of the following.

DETAILED DESCRIPTION OF THE INVENTION

The well cementing compositions of the invention include water, a hydraulic cement, and an additive for enhancing the interfacial sealing and bonding of the cement to casing and borehole. The term "hydraulic cement" is meant to encompass any inorganic cement which hardens or sets under water. Hydraulic cements, for example, include Portland cement, aluminous and pozzolan cement, blast furnace slag cement, and the like. The term is also intended to include cements having extenders such as bentonite, silicates, gilsonite, perlite, pozzolan (naturally occurring or manufactured flyash) or glass microspheres, gilsonite, ground coal or silica fume. The term also includes cements used either without any appreciable sand or aggregate material or such cements mixed with granular filling material, such as sand, ground limestone, crushed firebrick and the like. Mixtures of Portland cement and lightweight cement (also referred to as talc cement) or mixtures of Portland cement and blast furnace slag are effective within the scope of the invention.

While various hydraulic cements can be utilized in forming the slurries, Portland cements of the various types identified as API Class A through H and J cements are commonly utilized. These cements are identified and defined in "API Specification for Materials and Testing for Well Cements", API SPEC 10, Third Edition, July 1, 1986, of the American Petroleum Institute.

Various additives conventionally added to cement compositions useful in cementing casings in a borehole of a well can also be added to the novel cement compositions herein in the amounts normally used. These additives can include, for example, cement accelerators such as calcium chloride, sodium chloride, gypsum, sodium silicate and seawater; lightweight additives such as bentonite, diatomaceous earth, gilsonite, coal, perlite, and pozzolan (naturally occurring or manufactured flyash); heavy weight additives such as hematite, ilmenite, barite, silica flour, silica sand; cement retarders such as lignins, gluconic acid, sodium borate, boric acid, citric acid, lignosulfonates; filtration control additives such as polyvinyl acetate, vinyl sulfonate/vinyl amide polymers, cellulose derivatives, styrene-butadiene latex; dispersants such as naphthalene sulfonate formaldehyde condensates, polyphenol sulfonate condensates or acrylates. In addition, other unconventional additives such an xanthan gum can also be used.

A defoamer may be used with the invention. The defoamer is commonly employed in an amount from about 0.1 to 0.3% by weight of the cement and can be selected from any of the commercially available defoamers commonly used in cement slurries. Defoamers that are satisfactorily used in slurries include FOAM-MASTER ®A and PD-1 ®by Diamond Shamrock Corp. and NALCO ®3801 by Nalco Chemicals, Inc.

Where the cement is placed in an interval where the static temperature exceeds 230oF., it can also be desirable to include from about 20 to 50% silica sand or silica flour by weight of the cement, in the slurries of the invention to prevent strength retrogression. At static temperatures over about 230° F the strength of the cement will decrease over a period of time unless crystalline silica is added.

The mixing water !or the slurry can be fresh water, brackish water, brine, seawater, or other water-containing fluids. Mixing water is utilized with the dry cement composition to produce a fluid pumpable slurry. The amount of water used can vary over a wide range depending upon the consistency of the slurry, the density of the slurry required, the strength requirement for the particular job, and other factors.

The present cement compositions, in addition to hydraulic cement and water in a sufficient amount to produce a pumpable slurry also include an agent or agents to improve interfacial sealing and bonding and reduce shrinkage.

The preferred agents of the invention which improve interfacial sealing are water soluble polyalcohols having at least 2 carbon atoms and 2 hydroxyl groups but no more than 18 carbon atoms and 13 hydroxy groups. More preferably, the polyalcohols of the invention have at least 2 carbon atoms and 2 hydroxyl groups but no more than 9 carbon atoms and 7 hydroxyl groups. Glycerol is highly preferred for use with the invention. Also preferred are polyglycerols, cyclic glycerol, propanediol, (1,2 propanediol or 1,3 propanediol), and ethylene glycol.

The polyalcohols or mixtures of polyalcohols should be soluble in the cement slurry at the temperature conditions occurring during the placement and curing of the cement in the wellbore being cemented. Additionally, the polyalcohols or mixtures of polyalcohols should not precipitate or otherwise degrade under the actions of the ions in the cement slurry (e.g. resistant to calcium and electrolytes) and the temperature and pressure conditions occurring during the placement and curing of the cement.

Polyalcohols of the invention are water soluble at the temperature and pressure conditions in the wellbore during the placement and curing of the cement. The polyalcohols may also be soluble at the ambient temperature and pressure conditions on the surface during the preparation of the cement slurry. Some of the higher molecular weight polyalcohols may be very viscous liquids, or solids or have low solubility at the temperature conditions at the surface under which the slurry is prepared. In this case, the polyalcohol may be diluted or solubilized to form a solution which may be more easily added to or injected into the slurry at the surface. Monohydric alcohols such as methanol, ethanol, propanol, etc. which are readily soluble in water may be used to dilute or solubilize the higher molecular weight alcohol for addition to the slurry. Also, lower molecular weight polyalcohols may also be used as part of the solution containing the higher molecular weight polyalcohol.

Nonlimitative examples of such polyalcohols include (carbon chains may be straight chains, branched chains, cyclic, or alicyclic), ethylene glycol, diethylene glycol, 1,2-propanediol, 1,3-propanediol (propylene glycol), neopentyl glycol, pentaerythritol, 1,6-hexanediol, glycerol, open and cyclic telomers of glycerol such as diglycerols, triglycerols, tetraglycerols, pentaglycerols, and hexaglycerols, mixtures of glycerol and open and cyclic telomers of glycerol such as diglycerol and triglycerols, mixtures of open and cyclic telomers of glycerol, polyethylene glycols, polypropylene glycols, ethylenepropylene glycol, polyethylenepropylene glycols, ethylenepropylene glycol copolymers and ethylenebutylene glycol copolymers, 1,5,6,9-decanetetrol, 1,1,4,4-cyclohexanetetramethanol, 1,2,4,5-cyclohexanemethanol, 1,4-cyclohexanedimethanol, 1,3-cyclopentanedimethanol, 1,2,4,7-heptanetetrol, 1,2,3,5-heptanetetrol, 1,5,8-nonanetriol, 1,5,9-nonanetriol, 1,3,5,9-nonanetetrol, 1,3,5-heptanetriol, 2,4,6-heptanetriol, 4,4-dimethyl-1,2,3-pentanetriol, 1,1,3-cyclohexanetrimethanol, 1,3,4-cycloheptanetriol, 1,1-cyclopropanediol, 1,2-cyclopropanediol, 1,2,3-cyclopropanetriol, 1,1-cyclopropanedimethanol, 1,2-cyclopropanedimethanol, 1,2,3-cyclopropanedimethanol, 1,1-cyclobutanediol, 1,2-cyclobutanediol, 1,3-cyclobutanediol, 1,2-cyclobutanedimethanol, 1,2,3-cyclobutanetriol, 1,2,4-cyclobutanetriol, 1,2,3,4-cyclobutanetetrol, 1,3-dimethyl-1,2,3,4-cyclobutanetetrol, 1 hydroxy cyclobutanemethanol, 2-methyl-1,2-butanediol, 2-methyl-1,2.butanediol, 3-methyl-2,2-butanediol, 1,2-pentanediol, 1,3-pentanediol, 1,4-pentanediol, 2,3-pentanediol, 2,4.pentanediol, 1,2,3-pentanetriol, 1,2,4-pentanetriol, 2,3,4-pentanetriol, 1,1-cyclopentanediol, 1,2-cyclopentanediol, 1,3-cyclopentanediol, 1,2,3-cyclopentanetriol, 1,2-hexanediol, 1,3-hexanediol, 1,2,3-hexanetriol, 1,2,4-hexanetriol, 1,2,3,4-hexanetetrol, 1,1- cyclohexanediol, 1,2-cyclohexanediol, 1,4-cyclohexanediol, 1,2,4-cyclohexanetriol, 1,2,5-cyclohexanetriol, 1,2,3,4-cyclohexanetetrol, 1,2,3,5-cyclohexanetetrol.

The concentration of polyalcohol in the water phase used to prepare the slurry will generally be from about 0.01 to about 5% by volume, and more preferably from about 0.05 to about 3% by volume; excellent results have been obtained with concentrations between about 0.1 and about 2.5% by volume.

Slurries in accordance with the invention can be formed through the use of conventional techniques and apparatus normally employed in well cementing operations. The polyalcohol may be added to the bulk cement slurry prepared in a holding tank on the surface according to a procedure commonly referred to as batch mixing. However, the polyalcohol may be injected continuously into the slurry as it is prepared and pumped into the well by the use of an injection pump.

The viscosity of some polyalcohols of the invention may make addition to the slurry difficult. Also, some polyalcohols may be soluble at the temperature conditions in the wellbore during the placement and curing of the cement but have poor solubility in the slurry at the surface temperature conditions during preparation. In these cases, the polyalcohols may be diluted with a suitable solvent which is soluble in the cement slurry at the temperature conditions of slurry preparation at the surface. Such suitable solvents may act both to lower viscosity and increase solubility of the higher molecular weight alcohol for addition to the slurry on the surface. Such solvents may be other polyalcohols of lower molecular weight, alcohols such as methanol, ethanol, propanol, or isopropanol, water or mixtures of solvents and water.

The invention is particularly effective in sealing the annulus between casings in wells drilled with oil muds. Liner overlaps are common examples where cement is raised into the annulus between casings.

The following examples are illustrative and not limiting of the invention:

TABLE 1

Interfacial Sealing Comparison
Nitrogen Leak Rate at Cement/Pipe Interface
Measured after 24 hours @ 100° F.
Class H Portland Cement, Density: 16.4 lb/gal

| Additives and Concentration | Maximum Differential Pressure Held, psi | Nitrogen Leak Rate* |
|---|---|---|
| PRIOR ART | | |
| Cement Slurry, no alcohols | 300 | $3.77 \times 10^{-3}$ |
| PRESENT INVENTION | | |
| Ethylene Glycol 1.16 by volume of mix water Naphthalene Sulfonate formaldehyde condensate[1] 0.5% by wt. of cement | 500 | No Leak |
| Ethylene Glycol 2.33% by volume of mix water Napthalene Sulfonate formaldehyde condensate[1] 0.5% by wt. of cement | 2000 | No Leak |
| Glycerol, 2.33% by volume of mix water | 300 | No Leak |
| Polyglycerol 0.11% by volume of mix water | 1000 | No Leak |
| 1,2 Propanediol 2.33% by volume of mix water | 1000 | No Leak |

*Nitrogen Leak Rate at interface is in units of cc's/psi-minute
Leak test time: 30 to 60 minutes at indicated differential pressure
[1] Napthalene sulfonate formaldehyde condensate is present in the composition to reduce viscosity/gellation of the cement so it will be fluid enough to be placed in an annulus.

TABLE 2

Interfacial Sealing Comparison
Nitrogen Leak Rate at Cement/Pipe Interface
Measured after 24 hours @ 100° F.
Class H Portland Cement, Density: 16.4 lb/gal

| Additives and Concentration | Maximum Differential Pressure Held, psi | Nitrogen Leak Rate* |
|---|---|---|
| PRIOR ART | | |
| Napthalene Sulfonate formaldehyde condensate 0.25% by wt. of cement plus Calcium/Sodium lignosulfonate 0.15% by wt. of cement | 300 | $2.41 \times 10^{-3}$ |
| PRESENT INVENTION | | |
| Napthalene Sulfonate formaldehyde condensate 0.75% by wt. of cement plus Calcium/Sodium lignosulfonate 0.2% by wt. of cement plus Glycerol 1.16% by volume of mix water | 1500 | No Leak |
| Calcium/Sodium lignosulfonate 0.1% by wt. of cement plus Polyglycerol 1.11% by volume of mix water | 1500 | No Leak |

TABLE 2-continued

Interfacial Sealing Comparison
Nitrogen Leak Rate at Cement/Pipe Interface
Measured after 24 hours @ 100° F.
Class H Portland Cement, Density: 16.4 lb/gal

| Additives and Concentration | Maximum Differential Pressure Held, psi | Nitrogen Leak Rate* |
|---|---|---|
| Calcium/Sodium lignosulfonate 0.4% by wt. of cement plus Cyclicglycerols 2.33% by volume of mix water | 2000 | No Leak |

*Nitrogen Leak Rate at interface is in units of cc's/psi-minute
Leak test time: 30 to 60 minutes at indicated differential pressure
[1]Napthalene sulfonate formaldehyde condensate and Calcium/Sodium lignosulfonate are present to reduce viscosity and retard the cement so it will remain fluid long enough to be placed in an annulus.

TABLE 3

Cement Formulations

| Additives | Concentration % by weight | Polyalcohol Concentration % by volume of mix water solution |
|---|---|---|
| Class H Cement | 36.96 | |
| Flyash | 29.1 | |
| Mixture of Fresh Water and Glycerol | 33.94 | 1.1 |
| Class A Cement | 68.4 | |
| Mixture of Fresh Water and Propylene Glycol | 31.6 | 0.2 |
| Class H Cement | 70.69 | |
| Mixture of Sea Water and 1,2 Propanediol | 2.3 | 1.0 |
| Class H Cement | 69.93 | |
| Mixture of Fresh Water and Ethylene Glycol | 29.55 | 0.35 |
| carboxymethyl-hydroxy ethyl cellulose | 0.52 | |
| Class H Cement | 48.25 | |
| Silica flour | 16.89 | |
| Salt | 9.16 | |
| HOSTAMERE ® 2825 polymer[1] (vinyl sulfonate/vinyl amide) | .97 | |
| Lignosulfonate retarder | .001 | |
| Mixture of Fresh Water and $C_6$-$C_{18}$ polyglycerols | 24.73 | 1.0 |
| Class H Cement | 68.35 | |
| Mixture of Fresh Water and cyclic glycerols | 31.65 | 1.5 |
| Class H Cement | 36.72 | |
| Flyash | 28.91 | |
| Hydroxyethyl cellulose | 0.66 | |
| Mixture of Fresh Water and $C_3$-$C_{18}$ glycerol/polyglycerol | 33.71 | 0.4 |
| Class C Cement | 65.21 | |
| Mixture of Fresh Water and Diethylene glycol | 34.79 | 0.15 |
| Class H Cement | 74.16 | |
| Naphthalene sulfonate formaldehyde condensate dispersant | 0.56 | |
| Polyvinyl alcohol/vinyl acetate polymer | 0.003 | |
| Mixture of Fresh water and $C_6$-$C_{12}$ polyglycerols | 25.28 | 0.65 |
| Class G Cement | 69.11 | |
| Naphthalene sulfonate formaldehyde condensate dispersant | 0.35 | |
| Lignosulfonate retarder | 0.14 | |
| Mixture of Fresh Water and ethylenepropylene glycols | 30.40 | 1.2 |
| Class H Cement | 33.46 | |
| Flyash | 14.18 | |
| Bentonite | 2.86 | |
| Calcium chloride | 0.95 | |
| Mixture of Fresh Water and propylene glycol | 48.55 | 1.66 |
| Class G Cement | 36.13 | |
| Flyash | 28.44 | |
| Salt | 3.22 | |
| Mixture of Fresh Water and $C_6$-$C_{15}$ polypropylene glycols | 67.79 | 3.5 |
| Class H Cement | 36.01 | |
| Flyash | 28.35 | |
| Salt | 3.21 | |
| Hydroxyethyl cellulose | 0.32 | |

TABLE 3-continued

Cement Formulations

| Additives | Concentration % by weight | Polyalcohol Concentration % by volume of mix water solution |
|---|---|---|
| Mixture of Fresh Water and glycerol | 32.11 | 0.92 |
| Class H Cement | 54.5 | |
| Silica flour | 19.1 | |
| Potassium chloride | 1.2 | |
| Carboxymethyl hydroxy-ethyl cellulose | 0.44 | |
| Phenol sulfonate condensed with formaldehyde dispersant | 0.27 | |
| Lignosulfonate retarder | 0.30 | |
| Defoamer | 0.14 | |
| Mixture of Fresh Water and cyclicglycerols | 24.05 | 1.3 |
| Class H Cement | 40.58 | |
| Sodium silicate | 1.0 | |
| Mixture of Sea Water and $C_4$–$C_8$ Polyethylene glycols | 58.42 | 3.1 |
| Class H Cement | 45.5 | |
| Sand - 100 mesh | 15.92 | |
| Hematite | 16.94 | |
| Carboxymethyl hydroxyethyl cellulose | 0.34 | |
| Phenol sulfonate condensed with formaldehyde dispersant | 0.23 | |
| Lignosulfonate retarder | 0.23 | |
| Sodium borate hydrate | 0.23 | |
| Mixture of Fresh Water and diethylene glycol | 20.61 | 2.0 |
| Class G Cement | 36.41 | |
| Flyash | 28.66 | |
| Hydroxyethyl cellulose | 0.65 | |
| Mixture of Sea Water and glycerol | 34.28 | 2.0 |
| Class H Cement | 70.55 | |
| HOSTAMERE ® 2825 polymer[1] (vinyl sulfonate/vinyl amide) | 1.06 | |
| Lignosulfonate retarder | 0.18 | |
| Mixture of Fresh Water and propylene glycol | 28.21 | 1.3 |
| Class H Cement | 63.26 | |
| Silica fume | 6.73 | |
| Hydroxyethyl cellulose | .47 | |
| Lignosulfonate retarder | .001 | |
| Mixture of Fresh Water and glycerol | 29.54 | 0.33 |
| Class A Cement | 68.35 | |
| Mixture of Fresh Water and $C_6$–$C_9$ polypropylene glycols | 31.65 | 0.25 |
| Class H Cement | 49.09 | |
| Bentonite | 3.93 | |
| Mixture of Fresh Water and glycerol | 46.98 | 1.05 |
| Class H Cement | 69.93 | |
| Hydroxyethyl cellulose | 0.42 | |
| Aluminum powder | 0.28 | |
| Mixture of Fresh Water and $C_6$–$C_9$ polyglycerols | 29.37 | 0.5 |
| Class C Cement | 60.51 | |
| Salt | 6.03 | |
| Mixture of Fresh Water and diethylene glycol | 33.46 | 1.16 |
| Class G Cement | 52.52 | |
| Silica flour | 21.01 | |
| Potassium chloride | 1.29 | |
| Mixture of Fresh Water and $C_4$–$C_8$ polyethylene glycols | 25.18 | 0.9 |
| Class A Cement | 33.78 | |
| Flyash | 14.32 | |
| Bentonite | 2.89 | |
| Mixture of Fresh Water and 1,2 propanediol | 49.01 | 1.4 |
| Class H Cement | 34.84 | |
| Flyash | 27.42 | |
| Salt | 5.76 | |
| Mixture of Fresh Water and ethylene glycol | 31.98 | 1.0 |
| Class H Cement | 36.96 | |
| Flyash* | 29.1 | |
| Mixture of Fresh Water and 1,3,4 cycloheptanetriol | 33.94 | 0.33 |
| Class H Cement | 70.69 | |
| Mixture of Sea Water and 1 hydroxy cyclobutanemethanol | 29.3 | 0.5 |
| Class H Cement | 69.93 | |

TABLE 3-continued

| Additives | Cement Formulations Concentration % by weight | Polyalcohol Concentration % by volume of mix water solution |
|---|---|---|
| Carboxymethyl-hydroxy ethyl cellulose | 0.52 | |
| Mixture of Fresh Water and 1,4 cyclohexanediol | 29.54 | 0.25 |
| Class H Cement | 48.25 | |
| Silica flour | 16.89 | |
| Salt | 9.16 | |
| HOSTAMERE ® 2825 polymer[1] (vinyl sulfonate/vinyl amide) | .97 | |
| Lignosulfonate retarder | .001 | |
| Mixture of Fresh Water and neopentyl glycol | 24.63 | 0.15 |
| Class H Cement | 68.35 | |
| Mixture of Fresh Water and 1,2,3 cyclopropanetrimethanol | 31.11 | 0.75 |
| Class H Cement | 36.72 | |
| Flyash | 28.91 | |
| Hydroxyethyl cellulose | 0.66 | |
| Mixture of Fresh Water and 2,3 pentanediol | 33.71 | 0.96 |
| Class H Cement | 40.58 | |
| Sodium silicate | 1.0 | |
| Mixture of Sea Water and 1,2,4 hexanetriol | 58.4 | 1.0 |
| Class H Cement | 45.5 | |
| Sand - 100 mesh | 15.92 | |
| Hematite | 16.94 | |
| Carboxymethyl hydroxyethyl cellulose | 0.34 | |
| Phenol sulfonate condensed with formaldehyde dispersant | 0.23 | |
| Lignosulfonate retarder | 0.23 | |
| Sodium borate hydrate | 0.23 | |
| Mixture of Fresh Water and 1,5,6,9 decanetetrol | 20.64 | 0.6 |
| Class G Cement | 36.41 | |
| Flyash | 28.66 | |
| Hydroxyethyl cellulose | 0.65 | |
| Mixture of Sea Water and 1,2,3 cyclopropanetriol | 34.27 | 0.85 |
| Class H Cement | 70.55 | |
| HOSTAMERE ® 2825 polymer[1] (vinyl sulfonate/vinyl amide) | 1.06 | |
| Lignosulfonate retarder | 0.18 | |
| Mixture of Sea Water and 1,2,3,5 cyclohexanetetrol | 28.22 | 0.35 |
| Class H Cement | 63.26 | |
| Silica fume | 6.73 | |
| Hydroxyethyl cellulose | .47 | |
| Lignosulfonate retarder | .00 | |
| Mixture of Fresh Water and 3 methyl-2,2 butanediol | 29.54 | 1.2 |
| Class A Cement | 68.35 | |
| Mixture of Fresh Water and 1,2,3 cyclopentanetriol | 31.65 | 1.0 |
| Class H Cement | 49.09 | |
| Bentonite | 3.93 | |
| Mixture of Fresh Water and 1,2,3 cyclobutanetriol | 46.98 | 0.7 |
| Class H Cement | 74.16 | |
| Naphthalene sulfonate formaldehyde condensate dispersant | 0.56 | |
| Polyvinyl alcohol/vinyl acetate polymer | 0.003 | |
| Mixture of Fresh Water and 1,2,4 cyclohexanetriol | 24.99 | 1.03 |
| Class G Cement | 69.11 | |
| Naphthalene sulfonate formaldehyde condensate dispersant | 0.35 | |
| Lignosulfonate retarder | 0.14 | |
| Mixture of Fresh Water and 1,2,3,4 cyclobutaneterol | 30.41 | 0.4 |
| Class G Cement | 36.13 | |
| Flyash | 28.44 | |
| Salt | 3.22 | |
| Mixture of Fresh Water and 1,5,8 nonanetriol | 32.21 | 0.55 |
| Class H Cement | 36.01 | |
| Flyash | 28.35 | |
| Salt | 3.21 | |
| Hydroxyethyl cellulose | 0.32 | |

TABLE 3-continued

Cement Formulations

| Additives | Concentration % by weight | Polyalcohol Concentration % by volume of mix water solution |
|---|---|---|
| Mixture of Fresh Water and 1,2,3,5 heptanetetrol | 32.1 | 0.8 |
| Class H Cement | 54.5 | |
| Silica flour | 19.1 | |
| Potassium chloride | 1.2 | |
| Carboxymethyl hydroxyethyl cellulose | 0.44 | |
| Phenol sulfonate condensed with formaldehyde dispersant | 0.27 | |
| Lignosulfonate retarder | 0.30 | |
| Defoamer | 0.14 | |
| Mixture of Fresh Water and 1,6 hexanediol | 24.05 | 1.3 |
| Class H Cement | 69.93 | |
| Hydroxyethyl cellulose | 0.42 | |
| Aluminum powder | 0.28 | |
| Mixture of Fresh Water and 1,3,5 heptanetriol | 29.37 | 0.66 |
| Class C Cement | 60.51 | |
| Salt | 6.03 | |
| Mixture of Fresh Water and 1,2, cyclopropanediol | 33.46 | 0.1 |
| Class G Cement | 52.52 | |
| Silica flour | 21.01 | |
| Potassium chloride | 1.29 | |
| Mixture of Fresh Water and 1,1,4,4 cyclohexanetetramethanol | 25.18 | 0.45 |
| Class A Cement | 33.78 | |
| Flyash | 14.32 | |
| Bentonite | 2.89 | |
| Mixture of Fresh Water and 1,1 cyclobutanediol | 49.01 | 0.9 |
| Class H Cement | 34.84 | |
| Flyash | 27.42 | |
| Salt | 5.76 | |
| Mixture of Fresh Water and 1,3,5,9 nonanetetrol | 31.98 | 0.3 |

[1]Manufactured by Hoechst Celanese Corp.

The foregoing description of the invention is merely intended to be explanatory thereof, and various changes in the details of the described processes and compositions may be made within the scope of the appended claims without departing from the spirit of the invention.

What is claimed is:

1. A process for cementing a casing in a borehole of a well, comprising, preparing an aqueous cement slurry containing a sufficient amount of a selected water soluble polyalcohol having from 2 to 18 carbon atoms and 2 to 13 hydroxyl groups, the concentration of polyalcohol in the water used to prepare and set the slurry being about 0.01 to about 5% by volume, the selection of the polyalcohol being restricted to a polyalcohol which functions to promote a more fluid-tight seal and better mechanical shear bond between the cement and surfaces contacting the cement; and injecting the cement slurry into the well between the casing and the borehole.

2. The process of claim 1 wherein the polyalcohol is diluted with a monohydric alcohol which is readily soluble in water.

3. The process of claim 1 wherein the polyalcohol is diluted with a second polyalcohol which is more water soluble than the first said polyalcohol.

* * * * *